United States Patent Office 3,368,827
Patented Feb. 13, 1968

3,368,827
TILTING TRAILER
Stephen S. Dashew, Marina Del Rey, Calif., assignor to West Coast Industries, Inc., Venice, Calif., a corporation of California
Filed June 7, 1966, Ser. No. 555,881
5 Claims. (Cl. 280—401)

This invention relates to a trailer device and more particularly to improvements therein.

For advertisement and display purposes, large displays are generally employed to attract the attention of potential customers. Among the displays which are used, are gigantic figures, placed in a vertical position to attract attention. By using modern materials, such as fiberglass, the weight of such figures can be held down. However, due to their large size, moving such figures to the place where they are to be displayed is most cumbersome, often requiring a large vehicle for transporting the figures and several men for erecting the figure at the desired location.

It is therefore an object of the present invention to provide improved means for transporting and placing a large display device in a vertical position.

Another object of the present invention is to provide an improved trailer attachable to any conventional vehicle for hauling thereon a large display device which is displayed in a vertical position.

A further object of the present invention is to provide an improved trailer which serves as a means for hauling as well as placing a large display device in a vertical position.

These and other objects of the present invention are achieved by providing an improved trailer which comprises two basic parts. One part is a trailer, such as a boat trailer, attachable to any conventional vehicle such as a car. The trailer is large enough so that a gigantic display figure may be mounted thereon either in a horizontal or an inclined position. The other part of the trailer comprises a mobile platform to which the base of the giant figure is attachable. The platform is releasably couplable to the trailer so that during hauling, the two comprise an integral unit. When the figure is mounted on a trailer in a horizontal position, the mobile platform is disposed in a plane perpendicular to the horizontal plane of the trailer, while forming an angle therebetween when the figure is in an inclined position.

When the figure is brought to the location where it is to be displayed, the figure is raised to a vertical position, thereby placing the mobile platform on which it is mounted in a horizontal plane. By releasing the platform from the trailer, the figure is then movable on the platform to the place of its permanent display, where conventional fastening means may be used to secure the figure thereat.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
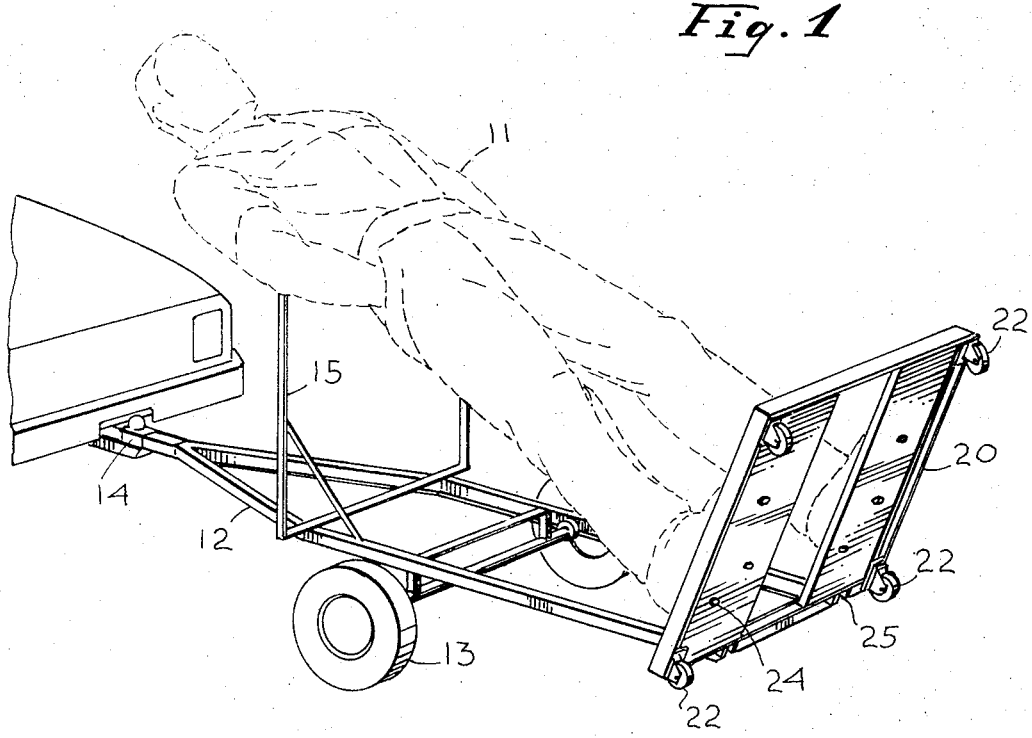
FIGURE 1 is a perspective side view of the trailer of the invention.

Reference is now made to FIGURE 1 which is a perspective view of the trailer of the present invention on which a large object, such as a display figure 11 is shown supported in an inclined position. The main portion of the trailer of the present invention comprises a structure 12 which may be similar to a boat trailer. It defines a horizontal platform supported off the ground by wheels 13 and having a hook 14 for attaching the structure to a moving vehicle (not shown). The overall size of the trailer necessary to transport a large figure may be held down by supporting the figure on the trailer, in an inclined position. For such purpose of the structure 12 may include a support bracket 15 vertically disposed with respect to the horizontal plane. The top of the support bracket 15 serves to support the figure 11 thereon.

Figure 2:
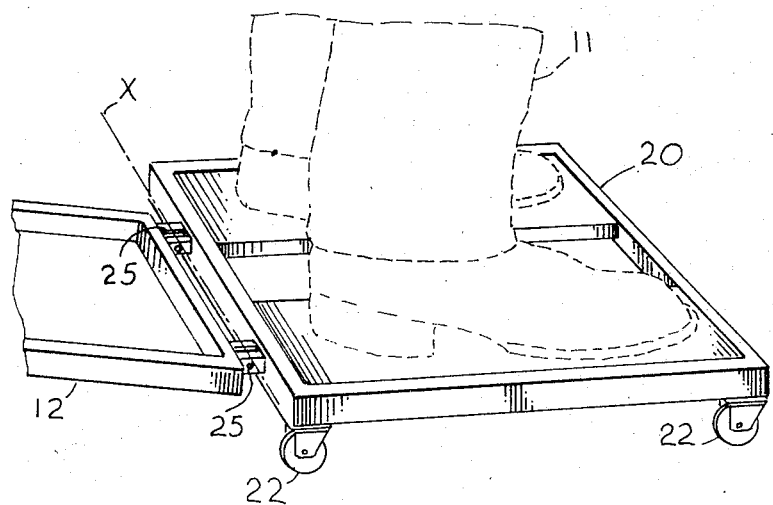
FIGURE 2 is a partial perspective side view, useful in explaining the structure and novel features of the invention.

The trailer of the invention also includes a mobile platform 20 including a plurality of wheels or casters 22 enabling the platform to be moved when placed in a horizontal plane on the ground. A plurality of fastening devices such as bolts 24 are used to support the base of figure 11 to the platform 20. The platform 20 is releasably couplable to the structure 12 by means of bolts 25 shown in FIGURE 2 to which reference is made herein. The bolts 25 are aligned along an axis designated by the letter X in FIGURE 2 about which the platform is rotatable. It is appreciated that any other conventional means may be employed to couple the platform 20 to structure 12, so that the platform can rotate about axis X, as well as be decoupled from the structure 12.

In practice, when an object such as display figure 11 is to be transported, it is brought to the structure 12 on the movable or mobile platform 20 on which it is supported. Thereafter, the bolts 25 are used to couple the platform to the structure 12, and the figure 11 lowered onto the support bracket 15, thereby raising the platform 20 off the ground. The figure 11 is then fastened or tightened to the support bracket to prevent it from sliding or changing position while being transported. Then, when the figure is to be vertically positioned, the figure is raised to a vertical position, such as for example by pulling on lines (not shown) attached near the top thereof. As the figure is pulled and brought to a vertical position, the platform rotates about axis X and is finally brought to a horizontal position with the platform being supported on the ground on casters 22. Thus, the figure 11 is in a vertical position on top of a movable platform. The bolts 25 are then removed, thereby releasing the movable platform from the structure 12 of the trailer, enabling the figure to be conveniently moved on the movable platform to the place where the figure is to be permanently displayed.

Since the figure, though large, may be constructed of a light material, such as fiberglass, the figure when supported on the mobile platform 20, can be brought to the structure 12 of the trailer for hauling purposes, as well as, be removed therefrom by a single person, even though the size of the figure is quite large. The only time that more than one person may be needed in hauling the figure is when lowering the figure onto the trailer to place it in either an inclined or horizontal position for moving or hauling purposes and possibly when the figure is raised to a vertical or erect position for display purposes. Otherwise the entire hauling and positioning operation of the large figure are accomplishable by a single individual. Thus the problem of transporting and positioning a large display figure is greatly minimized when using the novel trailer of the present invention hereinbefore described.

From the foregoing description, it should thus be apparent that the novel trailer of the present invention includes a structure on which a large figure can be supported, in either a horizontal or an inclined position. The trailer also includes a movable platform supporting the base of the figure. The platform is releasably fastenable to the trailer structure to form an integral unit when the figure is being transported. When the figure is transported in a horizontal position, the platform is disposed in a plane perpendicular to the horizontal plane of the trailer structure, while defining an angle therebetween when the figure is in an inclined position.

The mobile platform in addition to forming a part of the trailer, also serves to move the large cumbersome figure to the trailer structure for hauling purposes, as well as, move the figure therefrom to the position where it is to be displayed. By pivotably fastening the platform to the structure, the figure is conveniently lowered onto the structure, as well as raised therefrom, so as to minimize the number of people, and the time required for hauling and positioning the otherwise cumbersome large figure.

It is appreciated that those familiar with the art may make modifications in the arrangements as shown without departing from the true spirit of the invention. Thus, all such modifications and/or equivalents are deemed to fall within the scope of the invention as claimed in the appended claims.

What is claimed is:

1. A trailer for transporting an object erectable in a vertical position comprising:
   a movable structure for supporting the object thereon, said structure including means for coupling said movable structure to a moving vehicle;
   a mobile platform for supporting said object at the base thereof; and
   means for releasably coupling said platform to said movable structure to form an integral unit therewith when said object is supported on said structure with the object's base supported by said platform, said platform being releasable from said structure to move the object thereon when the object is in a vertical position.

2. The trailer defined in claim 1 wherein said platform is rotatably coupled to said structure to rotate about an axis of rotation in a first direction when said object having its base coupled to the platform is lowered onto said structure to be supported thereon, said platform being rotatable in an opposite direction to said first direction when said object is raised from said structure to be placed in a vertical position.

3. The trailer defined in claim 2 wherein said movable structure defines a horizontal plane and a support bracket integrally coupled to said structure for supporting said object in an inclined position with the mobile platform being rotated in said first direction to form an angle with said horizontal plane, when said object is in an inclined position, said platform being in a plane perpendicular to said horizontal plane when said object is supported on the horizontal plane defined by said object.

4. In combination,
   a movable structure for transporting a large display object supportable thereon, said structure including means at one end thereof for connecting said structure to a moving vehicle to be moved thereby;
   a mobile platform including a support plane and bolt means for supporting the base of said object thereon and a plurality of rolling members coupled to said support plane for rolling said plane and the object thereon when said object is in a vertical position; and
   means for releasably coupling the platform to said structure at an end opposite said one end, whereby said platform and structure form an integral unit for transporting said object when the object is being supported on said structure and the base thereof is supported on the support plane of said platform.

5. The combination defined in claim 4 wherein said platform is rotatably coupled to said structure to rotate in a first direction when said object is placed on said structure and to rotate in an opposite direction whereby said platform is placed in a horizontal plane with the object in an erect position when said object is raised off said structure.

References Cited

UNITED STATES PATENTS

| 2,234,433 | 3/1941 | Jeffrey | 214—3 |
| 2,606,673 | 8/1952 | Young. | |
| 2,686,060 | 8/1954 | Couse | 280—38 X |
| 2,706,055 | 4/1955 | Nichols | 280—401 X |
| 3,160,289 | 12/1964 | Leefer | 214—3 X |

LEO FRIAGLIA, *Primary Examiner.*